United States Patent
Weiner

(10) Patent No.: US 9,645,279 B2
(45) Date of Patent: May 9, 2017

(54) SYSTEMS AND METHODS FOR ALIGNING OBJECTS

(71) Applicant: INVIS-A-BEAM, LLC, Naples, FL (US)

(72) Inventor: Paul Weiner, Naples, FL (US)

(73) Assignee: Invis-a-Beam LLC, Naples, FL (US)

( * ) Notice: Subject to any disclaimer, the term of this patent is extended or adjusted under 35 U.S.C. 154(b) by 0 days.

(21) Appl. No.: 14/496,211

(22) Filed: Sep. 25, 2014

(65) Prior Publication Data

US 2015/0118007 A1 Apr. 30, 2015

Related U.S. Application Data

(60) Provisional application No. 61/898,124, filed on Oct. 31, 2013.

(51) Int. Cl.
*G01V 8/20* (2006.01)
*G01V 8/10* (2006.01)

(52) U.S. Cl.
CPC . *G01V 8/20* (2013.01); *G01V 8/10* (2013.01)

(58) Field of Classification Search
CPC .................................. G01V 8/20; B25J 11/00
USPC ...................................................... 250/338.1
See application file for complete search history.

(56) References Cited

U.S. PATENT DOCUMENTS

| | | | |
|---|---|---|---|
| 2,547,332 A | 4/1951 | Loveless et al. | |
| 2,613,933 A | 10/1952 | Johns et al. | |
| 3,596,103 A | 7/1971 | Matthews et al. | |
| 3,810,148 A | 5/1974 | Karsten et al. | |
| 4,186,388 A | 1/1980 | Robinson | |
| 4,998,093 A * | 3/1991 | Benoit | G08G 1/04 340/556 |
| 5,554,972 A * | 9/1996 | Byrne | 340/556 |
| 5,629,767 A * | 5/1997 | Tchejeyan | 356/153 |
| 5,678,789 A | 10/1997 | Pipich | |
| 5,691,697 A * | 11/1997 | Carvalho | G08B 13/20 340/426.24 |
| 5,945,907 A | 8/1999 | Yaron et al. | |
| 6,191,706 B1 | 2/2001 | Kositkun | |
| 6,853,313 B2 | 2/2005 | Newcomer | |
| 6,881,957 B2 | 4/2005 | Dougherty et al. | |
| 6,970,083 B2 | 11/2005 | Venetianer et al. | |

(Continued)

FOREIGN PATENT DOCUMENTS

EP 1353145 10/2003

*Primary Examiner* — Marcus Taningco
(74) *Attorney, Agent, or Firm* — Baker Donelson; Nigamnarayan Acharya

(57) ABSTRACT

Methods herein relate to aligning objects and can include aligning a transmitter and a receiver to establish a reference line, advancing one or more objects in a direction of advance toward the reference line, interrupting the reference line with the one or more objects and withdrawing the one or more objects opposite the direction of advance until the reference line is uninterrupted. Alternative or complementary aspects relating to alignment can include detecting an interruption of the reference line based on an object entering the path between the transmitter and the receiver, transmitting an interruption signal based on the detected interruption of the reference line detecting a reestablishment of the reference, and transmitting a continuity signal based on the detected reestablishment of the reference line. Systems for effecting such techniques are also disclosed.

5 Claims, 7 Drawing Sheets

(56) References Cited

U.S. PATENT DOCUMENTS

| | | |
|---|---|---|
| 8,209,874 B1 | 7/2012 | Tribble et al. |
| 8,466,808 B2 | 6/2013 | Ghatak |
| 2004/0246122 A1* | 12/2004 | Bailey, III ......... A47G 29/1214 340/506 |
| 2013/0042530 A1 | 2/2013 | Leivenzon et al. |
| 2013/0250096 A1* | 9/2013 | Rydqvist ........................ 348/95 |

* cited by examiner

SYSTEMS AND METHODS FOR ALIGNING OBJECTS

CROSS REFERENCE TO RELATED APPLICATION

This application claims priority to U.S. Provisional Patent Application 61/898,124, filed Oct. 31, 2013, which is incorporated here by reference.

FIELD OF THE INVENTION

This invention generally relates to aligning objects. More particularly, systems and methods for aligning objects are disclosed that relate to tracking interruption or reestablishment of emitted energy and/or line of sight between a transmitter and a receiver based on the position of one or more objects and communicating an indication of the interruption or reestablishment to a remote operator unit.

BACKGROUND

In many applications, the alignment of objects is frequently challenging, and can have a meaningful impact on a business' costs and revenues. For example, the alignment of products, such as automobiles, pallets, boxes, or even tables in a service space, will influence the amount of the products that fit in the given space, or impact the layout of useful space there between. Improper alignment of products can increase the likelihood of undesirable losses, such as damage from unintended contact, misplacement or misidentification, disruption of transit routes (e.g., rows in a parking lot, aisles in a warehouse), and others. Such outcomes increase the costs incurred by a business, both in total and per unit area by facility.

Further, the aesthetic results of proper alignment can yield positive benefits in terms of increased revenue or reduced costs. Proper alignment of products presents customers with a professional, expert image of the business, and instills pride and discipline in employees who will exercise greater care and thoughtfulness in their jobs when presented with an environment focused in attention to detail. Thus, it is clear that increased capability to align objects is desirable in many environments.

However, as noted above, the execution of aligning objects, especially over extended distances, is frequently involved and labor intensive. For example, aligning cars along the frontage of a car dealership lot is time-consuming and frequently executed using multiple drivers and spotters to carefully pull different-sized cars into an aesthetically pleasing arrangement. The drivers frequently have little perspective of the edge of their bumper, and must either frequently exit the car to check the vehicle's position or attempt to communicate with spotters who may be located at a distance from the vehicle being moved.

In another example, forklift operators may handle pallets of different sizes for placement in racks of different sizes. Placing a pallet too far inward increases the risk of the pallet sliding off a front support and falling inward, hitting or moving a pallet in an adjacent rack, and/or the difficulty of identification of the pallet for later removal. Placing a pallet too far outward increases the risk that it will slide off the rear support or be hit by a passing vehicle. Because even skilled forklift operators cannot see the precise edges of their payload and vehicle, alignment presents a variety of challenges in this environment as well.

The example scenarios discussed, as well as many others that will be perceived by those of ordinary skill in the art, would accordingly benefit from new systems and methods facilitating fast, accurate, and flexible alignment of objects.

SUMMARY

Presently disclosed are systems and methods of aligning objects. Such methods can comprise aligning a reference line transmitter and a reference line receiver to establish a reference line and advancing one or more objects in a direction of advance toward the reference line. Such methods herein can also include interrupting the reference line with the one or more objects and withdrawing the one or more objects opposite the direction of advance until the reference line is uninterrupted.

In a system used in accordance with techniques described herein, there can also be one or more systems for aligning objects. Such systems can include a reference line transmitter configured to bound a reference line at a first point and a reference line signal transmitter of the reference line transmitter configured to emit a reference line energy along a bounded segment of the reference line between the first point and a second point. The systems further include a reference line receiver configured to bound the reference line at the second point and a reference line signal receiver of the reference line receiver configured to receive the reference line energy. The systems can also be implemented using a reference line continuity module configured to detect at least one of a breach of the reference line and a reestablishment of the reference line and a feedback transmitter of the reference line receiver configured to transmit a notification signal based on the at least one of the breach of the reference line and the reestablishment of the reference line.

Other example methodologies set forth herein also relate to a method of aligning objects. Such methodologies can comprise aligning a reference line transmitter and a reference line receiver to establish a reference line, detecting an interruption of the reference line based on an object entering the path between the reference line transmitter and the reference line receiver, and transmitting an interruption signal based on the detected interruption of the reference line. Such methodologies can further include detecting a reestablishment of the reference line based on an object exiting the path between the reference line transmitter and the reference line receiver and transmitting a continuity signal based on the detected reestablishment of the reference line.

Various aspects will become apparent to those skilled in the art from the following detailed description and the accompanying drawings.

DETAILED DESCRIPTION

Figure 1:
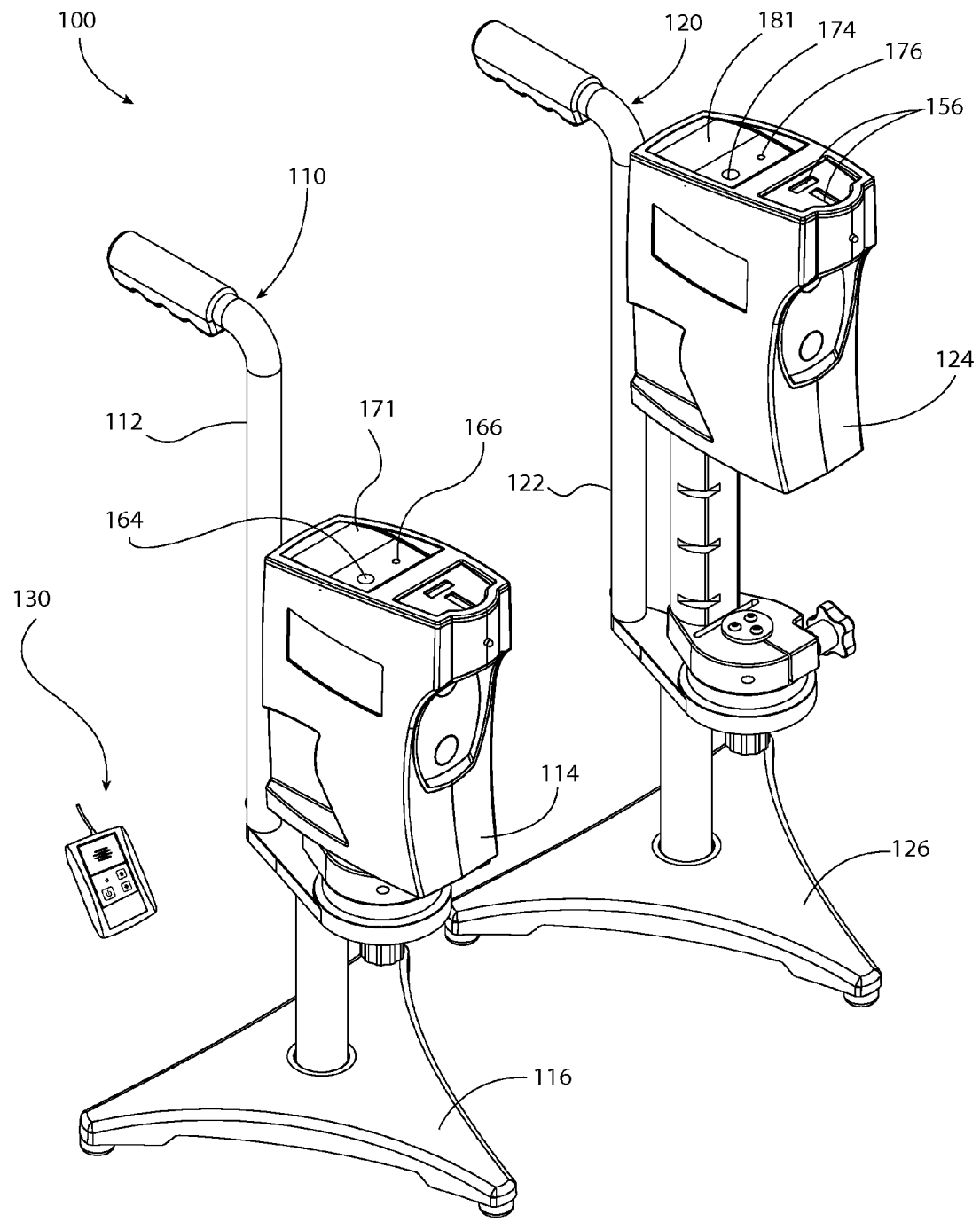
FIG. 1 illustrates an example system for establishing a reference line and receiving signals related to the reference line.

Systems and methods disclosed herein relate to aligning objects. In particular, specific embodiments described relate to establishing a reference line, and providing feedback when the reference line is interrupted or reestablished.

As used herein, a reference line is a line on which one or more objects are sought to be aligned or arranged in reference to. A reference line is generally established by way of unobstructed, line-of-sight contact or connectivity between a reference line transmitter and reference line receiver.

By placing a reference line transmitter and reference line receiver in wireless contact, this improves over using other markings between two points. For example, a fence or rope might be used to mark an edge, but is difficult to judge in terms of its distance from an unseen edge of an object, easy to knock over, and may even cause damage to a product if bumped when seeking alignment. Similarly, ground markings or overhead signage do not give operators moving objects a sense of how far an unseen edge of the object may be from the actual desired reference line. Further, such crude solutions may be untenable in various applications. For example, fence installation or ground marking is expensive and disruptive to a desired aesthetic, and ropes may sag or shift when strung over distances. By using a system establishing a reference line that relies on portable reference line transmitters and reference line receivers exchanging a projected energy, high levels of accuracy can be achieved with great speed by a single user. For example, in tests of an embodiment of the present innovation, objects were staged to an accuracy of less than one inch, and in instances as little as three-quarters of one inch or smaller, along a 330 foot (100 meter) long reference line. In further tests, an embodiment of the present invention was shown to be accurate to within one-eighth of one inch along a 330 foot (100 meter) long reference line.

While a reference line is generally depicted and described as a line segment between a transmitter and receiver, it is understood that a reference line may also be an area or a volume. For example, a signal or energy between a reference line transmitter and reference line receiver that coincides with or establishes the reference line can be a plane (or portion thereof), a space (or portion thereof), or according to other geometry. In such instances, any interruption or penetration of the area or volume can be detected, and in embodiments, used to provide feedback as to an amount of interruption (e.g., how far into the space an edge of the object is located). Such embodiments can be realized using one or more than one reference line transmitter and/or reference line receiver, and can additionally be employed to align or arrange objects in two or more dimensions (e.g., aligned along two axes, aligned by height, and others).

As suggested above, as used herein, an interruption, breach, break, or similar language used regarding a reference line generally describes an object entering a line or field between a reference line receiver and reference line transmitter. In some embodiments, this includes interrupting the line of sight between at least a portion of a reference line transmitter and reference line receiver, and is detected by, for example, a break in the continuous reception of the signal between the reference line transmitter and reference line receiver, a change to the signal or energy received by the reference line receiver (e.g., indicating deflection, disruption, and so forth), and others.

To prevent false positives in the detection of interruptions, reference line receivers and/or reference line transmitters related to the reference line can recalibrate or focus, periodically or on-demand, to adjust to an environment in which they are used. For example, a reference line receiver can recalibrate during precipitation to ensure the weather does not prevent accurate use of the system. In another example, the reference line receiver can recalibrate based on a very long or very short distance between the reference line transmitter and reference line receiver.

Reference lines can have a status. Statuses can include uninterrupted, interrupted, misaligned, or others. For example, an uninterrupted status can mean no objects are interrupting the line. An interrupted status can be partial or complete, with a partial interrupted status including, for example, a reduced amount of energy received, reception of deflected or modified energy, a portion of a field being interrupted, and so forth. A misaligned status can include where both the reference line transmitter and reference line receiver are on, but the signal or energy transmitted from the reference line transmitter is not properly directed at a receiving area of the reference line receiver.

Various types of transmitters and receivers can be employed in the present innovation. As suggested above, a reference line transmitter is located at one endpoint of a line segment along or defining the reference line, and transmits a signal or energy coincident with or establishing the reference line to a reference line receiver located at an opposite endpoint of the line segment along or defining the reference line.

In addition, data transmitters and receivers are utilized in embodiments of the disclosed systems and methods. Data transmitters can be wired or wireless, and transfer information between two or more components of the system. For example, the reference line transmitter and reference line receiver can exchange information using the same or different means as is used to transmit and receive the energy representing the reference line. In an embodiment, a misaligned state can be determined by data communication between the reference line transmitter and reference line receiver independent of the reference line signal or energy (e.g., such as where the reference line signal is not received but the reference line receiver receives information indicating a reference line signal is expected due to the activity of the reference line transmitter). In addition, one or both of the reference line receiver and reference line transmitter can transmit (and/or receive) information from an operator unit to provide information related to continuity or interruption of the reference line.

An operator unit, as used herein, can be a dedicated handheld device, a multifunction device (e.g., smart phone or tablet) running an application or configured to receive data from one or both of the reference line receiver and reference line transmitter, a built-in device in a vehicle or other object (e.g., onboard computer, built-in alarm), or others that facilitate the provisioning of feedback to the operator unit. The operator unit may be a wireless device, with a radio frequency (RF) receiver, eliminating the need for a user to remain co-located with either the reference line transmitter or receiver. In some embodiments, the operator unit provides an operator with information related to the continuity or interruption of the reference line. In some embodiments, the system provides an operator with the information related to the continuity or interruption of the reference line in real time to facilitate use of the system for aligning objects adjacent to the reference line as described below. In alternative or complementary embodiments, a data (or other) signal related to state of the reference line can effect automatic control of a vehicle or other machine related to movement of the object (e.g., automatic braking or reversal to avoid overshooting reference line or impacting material beyond reference line).

In an example of a method for aligning objects in accordance with aspects herein, the step of aligning a reference line transmitter and a reference line receiver to establish a reference line is performed. In some embodiments, the reference line can preexist alignment of the transmitter and receiver, and the transmitter and receiver projects a signal coincident with the reference line. In alternative embodiments, the reference line is the signal, and does not exist until the reference line transmitter and reference line receiver are energized and aligned.

Another step of the example method can include advancing one or more objects in a direction of advance toward the reference line. Advancing one or more objects can be done manually, automatically, or in varying degrees or combinations of both.

The advance of the objects will eventually enter the reference line or a cross-section associated therewith. Thus, a subsequent step of the example method includes interrupting the reference line with the one or more objects.

Once the line is interrupted, the example method comprises withdrawing the one or more objects opposite the direction of advance until the reference line is uninterrupted. At the location associated with the line becoming uninterrupted from an interrupted status, the edge of the object will be aligned with the reference line.

The example method can further include transmitting an interruption signal to an operator unit in response to interrupting the reference line with the one or more objects, and/or transmitting a reestablishment signal to the operator unit in response to uninterrupted reestablishment of the reference line by withdrawing the one or more objects opposite the direction of advance.

Alignment of the reference line receiver and reference line transmitter can involve placing the reference line transmitter at a first point of the reference line, and/or placing the reference line receiver at a second point of the reference line. Further, the step of leveling at least one of the reference line transmitter and the reference line transceiver can be completed. The example method can also include synching a transmitting portion of the reference line transmitter and a receiving portion of the reference line receiver. Additionally, alternative or complementary techniques comprise raising the reference line transmitter to a line height and/or raising the reference line receiver to the line height.

In an alternative example method, a method of aligning objects includes aligning a reference line transmitter and a reference line receiver to establish a reference line. After establishing the reference line, a subsequent step includes detecting an interruption of the reference line based on an object entering the path between the reference line transmitter and the reference line receiver. Upon interruption, the step of transmitting an interruption signal based on the detected interruption of the reference line is completed. Thereafter, the step of detecting a reestablishment of the reference line based on an object exiting the path between the reference line transmitter and the reference line receiver is executed. Thereafter, the method includes a step related to transmitting a continuity signal based on the detected reestablishment of the reference line. Various signals transmitted and/or received can relate to the status of the reference line as influenced by one or more objects being aligned or the functioning of the overall system.

Systems for use in these methods include various components associated with reference line receivers and reference line transmitters. An example reference line transmitter is configured to bound a reference line at a first point and includes a reference line signal transmitter configured to emit a reference line energy along a bounded segment of the reference line between the first point and a second point. Similarly, an example reference line receiver is configured to bound the reference line at the second point and includes a reference line signal receiver configured to receive the reference line energy.

One or both of the reference line signal transmitter and reference line signal receiver, or other components, can include a standalone or distributed reference line continuity module configured to detect at least one of a breach of the reference line and a reestablishment of the reference line. The reference line continuity module can additionally determine other statuses or activity related to the reference line. In an embodiment, a received signal that includes at least a portion of the transmitted reference line signal is received by the reference line receiver and processed to determine a status of the reference line.

Systems herein can also include a feedback transmitter configured to transmit a notification signal based on the at least one of the breach of the reference line and the reestablishment of the reference line. The feedback transmitter can be implemented standalone or distributed in one or more of the reference line receiver, reference line transmitter, and other components. In a specific embodiment, because the receiver receives the energy or signal associated with the reference line, and determines (at least in part) whether the received energy or signal matches the expected or previously-received energy or signal to detect an interruption, the feedback transmitter is implemented in the reference line receiver.

Systems herein utilizing a feedback transmitter also include a feedback receiver configured to receive the notification signal. The feedback receiver can be in an operator unit as described above, or another system or component. The feedback receiver can interact with an indicator module configured to present an indication based at least in part on the notification signal. The operator unit can also include a control interface configured to receive at least one operator input from an operator of the operator unit. For example, the operator input can be related to modifying a characteristic of the indication, such as changing the way the indication is presented to a user of the operator unit (e.g., sound, volume, light, color, turn on or turn off graphic display, and others). As suggested the indication may be an audible signal, a visual signal, others, and/or combinations thereof.

Example systems can additionally include a leveling indicator module of at least one of the reference line transmitter and the reference line receiver configured to indicate a level status of the at least one of the reference line transmitter and reference line receiver, and a leveling adjustment module of at least one of the reference line transmitter and the reference line receiver configured to adjust a level status of the at least one of the reference line transmitter and reference line receiver. The leveling adjustment module can include one or more movable portions of the reference line receiver and reference line transmitter which change the angles at which the reference line receiver or the reference line transmitter are oriented in its position. While the leveling module is shown herein as a threaded footing which raises or lowers a portion of a base of the leveling adjustment module, it is understood that two or more sub-modules raising or lowering the base, or portions thereof, can be employed. In addition, various means of rotating a support member, and various means of angling connectors between the support member and the reference line transmitter and/or reference line receiver can be employed independently or in combination to effect leveling.

Additional or complementary embodiments can include an elevation module of at least one of the reference line transmitter and the reference line receiver configured to establish a height of the at least one of the reference line transmitter and reference line receiver. While the elevation module is shown in the figures herewith as a telescoping support member including two or more portions that raise or lower with respect to one another, it is understood that various other means of raising or lowering the reference line transmitter or reference line transceiver can be employed without departing from the scope or spirit of the innovation. For example, the reference line transmitter and/or reference line receiver can be mounted at different heights along a support member, multi-part support members can have additional sections added or removed, and so forth.

At long distances, it can become difficult to align the reference line transmitter and reference line receiver. Accordingly, a sight unit can be provided to assist with visual alignment of the reference line transmitter and reference line receiver. Thus, example systems described herein can also include a sight module of at least one of the reference line transmitter and the reference line receiver configured to visually align the reference line transmitter and the reference line receiver prior to emitting the reference line energy. In an embodiment, a sight module can include a visible laser or similar means of alignment. In alternative or complementary embodiments, a sight module can include a magnified or un-magnified telescope which is used to aim the reference line transmitter at the reference line receiver. In such visual applications, the reference line receiver can include one or more aiming points which can be easily identified to facilitate appropriate alignment. In still further alternative or complementary embodiments, a sight module can include or be supplemented by automatic notifications related to refining alignment of the reference line transmitter and reference line receiver, such as a visual or audible signal that changes its frequency or other characteristics based on how close the reference line transmitter and reference line receiver are to proper alignment. In some embodiments, either or both of the reference line transmitter and reference line receiver may include indicators, such as LEDs, to provide a visual indication of alignment or misalignment of the system components.

In a similar aspect, example systems can include a pairing indicator module of at least one of the reference line transmitter and the reference line receiver configured to indicate uninterrupted reception of the reference line energy by the reference line receiver. The pairing indicator module can provide a local operator confirmation of proper (or improper) alignment between the reference line transmitter and reference line receiver. One or more pairing indicator modules, or components thereof, may be located on one or more of the reference line transmitter, reference line receiver, and operator unit. As with the sight unit, the pairing indicator module may include one or more LEDs configured to indicate a status of the alignment. In other embodiments, a multicolor LED may be used to provide additional indications related to the proper pairing and alignment of the reference line transmitter and reference line receiver.

Further embodiments of systems herein can include an interruption counter module of the reference line receiver (or another component) configured to count and store a number of objects crossing the reference line. The interruption counter module can be a logic within one or more of the reference line transmitter or reference line receiver that determines how many times a line is broken. This enables systems herein to function as a virtual turnstile or counter for people or objects. In particular embodiments, two or more sets of reference line transmitters and reference line receivers can share counter information based on their respective locations to determine which reference line crossings correspond to entries and which correspond to exits.

In addition, systems herein can further comprise two or more power modules of the reference line transmitter and the reference line receiver configured to provide electrical power to at least the reference line transmitter and the reference line receiver. The power modules can include local batteries, charging couplings for connecting to a power source, and/or in specific embodiments employ local means of collecting energy to power the system or recharge batteries (e.g., solar panels). In other embodiments, the system may be directly powered from an AC or DC power source, and may be hardwired to a power source when mobility of the system is not required.

Turning now to the figures, FIG. 1 illustrates an example system 100 for establishing a reference line and receiving signals related to the reference line. System 100 includes reference line transmitter 110, reference line receiver 120, and operator unit 130, in accordance with the aspects described above.

Reference line transmitter 110 includes transmitter stand 112, reference line signal transmitter 114, and transmitter base 116. Reference line signal transmitter 114 can emit an energy or signal establishing, occupying, or coincident with a reference line (or other defined marker). The energy or signal can include, but is not limited to, visible or invisible light (including lasers), radio waves, sonic waves, and other technologies. In specific embodiments, the signal can be an infrared (IR) emission. In alternative or complementary embodiments, a camera image (e.g., traditional, thermal, infrared) can be processed and analyzed in an ongoing basis to determine an interruption to a line of sight. Various combinations of two or more energies, signals, or images can be employed to facilitate multi-factor reference line observation.

Transmitter base 116 provides stable support for transmitter stand 112, which securely maintains reference line signal transmitter 114 in a position where steady line of sight can be established with reference line receiver 120.

The reference line transmitter 114 further includes manual power switch 164 and local indicators 166-170. Local indicators 166-170 can be, for example, one or more light emitting diodes, and optionally multi-color light emitting diodes, or other signaling components used to indicate various information related to the system. For example, local indicator 166 indicates that reference line signal transmitter 114 is presently powered. In this regard, local indicator 166 can blink or change its character in the event of low battery, full charge, wired power connectivity, and according to other power information.

Similar to reference line transmitter 110, reference line receiver 120 includes receiver stand 122, reference line signal receiver 124, and receiver base 126. Reference line signal receiver 124 can receive the energy or signal establishing, occupying, or coincident with the reference line (or other defined marker) from reference line transmitter 110. Receiver base 126 provides stable support for receiver stand 122, which securely maintains reference line signal receiver 124 in a position where steady line of sight can be established with reference line transmitter 110.

The reference line receiver 124 further includes manual power switch 174 and local indicators 176-180. Local indicators 176-180 can be, for example, one or more light emitting diodes, and optionally multi-color light emitting diodes, or other signaling components used to indicate various information related to the system. For example, local indicator 176 indicates that reference line signal receiver 124 is presently powered. In this regard, local indicator 176 can blink or change its character in the event of low battery, full charge, wired power connectivity, and according to other power information.

Reference line signal transmitter 110 and reference line receiver 120 each include a leveling bubble 156. A leveling bubble 156 is pictured as a pair of tubular bubble levels. In other embodiments, a leveling bubble 156 may include one or more levels, or a circular level, to facilitate leveling in multiple dimensions.

In specific embodiments, reference line signal transmitter 114 and/or reference line receiver 124 can include a solar panel 171 or 181 respectively, or other means of supplementing power received and/or stored through conventional electrical connections.

Operator unit 130 can receive and output one or more signals relating to the status of the reference line defined at least in part by reference line transmitter 110 and reference line receiver 120. In the embodiment depicted, operator unit 130 is a standalone handheld device including a wireless data receiver, speaker, light source (e.g., LEDs), controls, and battery power source. Operator unit 130 receives signals relating to the status of the reference line and provides one or more of audible and visual signals (e.g., beeping, continuous tone, combinations of one or more solid or blinking lights) indicating information related to the status of the reference line. The controls (such as power button 318 and volume controls 316 illustrated in FIG. 3) are used, for example, to turn the standalone handheld device on or off, increase or decrease the volume of the speaker. Other controls may be provided to increase or decrease the brightness or color of light source(s), and toggle between or modify signals provided.

Figure 2:
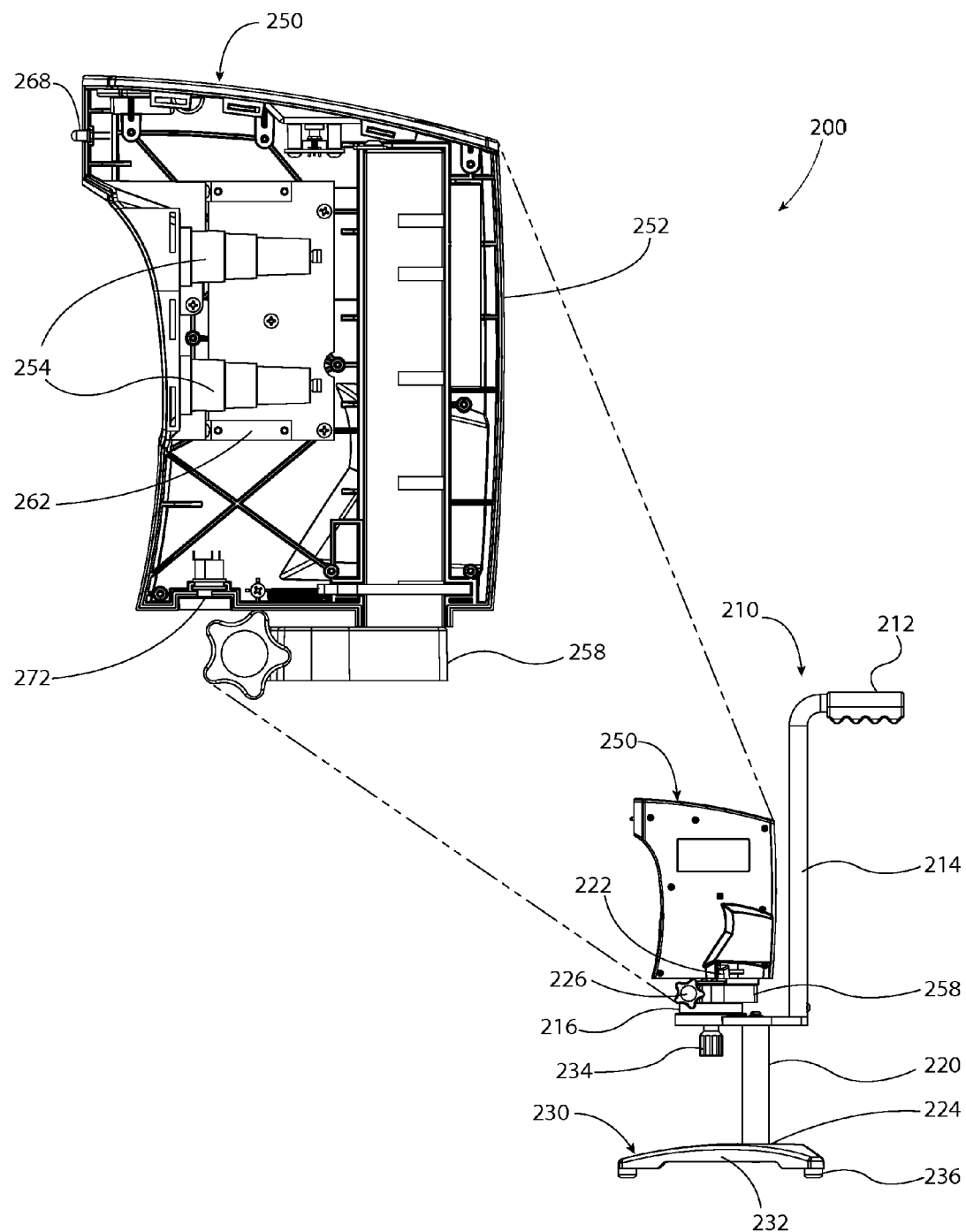
FIG. 2 illustrates an example system including a reference line transceiver including aspects utilized in both the transmission and reception of reference lines.

FIG. 2 illustrates an example system 200 including a reference line transceiver 210 illustrating aspects utilized in both the transmission and reception of reference lines. Reference line transceiver 210 provides additional detail related to aspects of one or both of reference line transmitter 110 and reference line receiver 120. In one or more embodiments, system 100 can be implemented using two or more identical reference line transceivers 210 capable of both transmitting and receiving a reference line signal and data related to the reference line.

Reference line transceiver 210 includes an assembly having handle 212 which projects from upper stand shaft 214. Upper stand shaft 214 is movably coupled with lower stand shaft 220, which is in turn fixed to base 230 at shaft attachment point 224. Upper stand shaft 214 and lower stand shaft 220 may be fixed or released relative to one another. In alternative embodiments, a button, clamp, or other fixing mechanism can be utilized to secure upper stand shaft 214 with respect to lower stand shaft 220.

Base 230 includes base body 232 having shaft attachment point 224. Base 230 can include a plurality of feet 236 which extend from edges or ends of base 230. While base 230 is shown herein in a configuration having three feet 236, it is understood that alternative configurations with fewer or more feet can be utilized without departing from the scope or spirit of the innovation.

Leveling module 234 can raise or lower the level status of reference line signal transceiver 250. In embodiments, leveling module 234 is a manual mechanical component, such as the knob depicted with a threaded member for raising and lowering reference line signal transceiver 250. In the embodiment of FIG. 2, a single leveling module 234 is illustrated. In other embodiments, it is understood that a leveling module may be associated with any of the upper stand shaft 214, lower stand shaft 220, each of feet 236, or other portions capable of influencing the cant of reference line transceiver 210. In some embodiments, base 230 further includes leveling module 234. Leveling module 234 can raise or lower one or more of feet 236 to change the level status of reference line signal transceiver 250. In embodiments, leveling module 234 is a manual mechanical component, such as the knob depicted with a threaded member for raising and lowering one or more of feet 236. While base 230 only depicts a single leveling module 234, it is understood that a leveling module can be associated with each of feet 236 or other portions capable of influencing the cant of reference line transceiver 210. For example, in embodiments similar to that illustrated, three leveling modules 234 are included on each of the feet 236.

The mounting bracket 216 and the attachment member 258 are adjustable to modify the height, cant, or relative position of the reference line signal transceiver 250 in relation to other components in conjunction with the rotational lock 226 and the telescoping lock 222. The rotational lock 226 may be a screw, a button, clamp, or other fixing mechanism. The telescoping lock 222 may be a screw, a button, clamp, or other fixing mechanism. In embodiments, mounting brackets 216 and 218 are connected to at least one of upper stand shaft 214 and lower stand shaft 220. Mounting brackets 216 and 218 correspond to attachment member 258, and couple reference line signal transceiver 250 with one or more of upper stand shaft 214 and lower stand shaft 220. In embodiments, one or more of mounting brackets 216 and 218 and attachment member 258 are adjustable to modify the height, cant, or relative position of reference line signal transceiver 250 in relation to other components. In some embodiments, the mounting brackets and attachment members may be integrated with a housing of the reference line signal transceiver 250 to simplify assembly and deployment of the system.

Reference line signal transceiver 250 houses the electrical components of reference line transceiver 210. Reference line signal transceiver 250 includes body 252, which is a housing constructed of a suitable material for containing electrical components. Reference line signal nodes 254 provide transceiver functionality with respect to the reference line, facilitating one or more of transmission and reception capability for one or more energies or signals associated with a reference line. Further, reference line signal nodes 254 provide information transmitted or received to various logical components executed by electronic components of reference line signal transceiver 250 which can be used to infer a status of a reference line based on emission or reception by reference line transceiver 210.

Reference line signal transceiver 250 further includes wireless data transceiver 262. Wireless data transceiver 262 can transmit to or couple with one or more other components, such as an operator unit, to provide indication of the status of a reference line. Further, wireless data transceiver 262 can be coupled to one or more other components of reference line signal transceiver 250 to effect remote powering or control of reference line signal transceiver 250 or associated components.

Reference line signal transceiver 250 can further include manual power switch and local indicators 266-270. Local indicators 266-270 can be, for example, one or more light emitting diodes, and optionally multi-color light emitting diodes, or other signaling components used to indicate various information related to the system. For example, a local indicator indicates that reference line signal transceiver 250 is presently powered. In this regard, a local indicator can blink or change its character in the event of low battery, full charge, wired power connectivity, and according to other power information. In another example, local indicator 268 indicates coupling of reference line transceiver 210 with another reference line device, such that it is indicated that reference line signal transceiver 250 is paired, coupled, and/or properly aligned with the other reference line signal device. Finally, indicator 268, in specific examples, indicates a status (e.g., uninterrupted, interrupted) of the reference line segment between reference line signal transceiver 250 and another reference line device. In this manner, the system may include a plurality of indictors to provide immediate presentation of information regarding the status and operation of the system.

Reference line signal transceiver 250 includes electrical port 272 permitting wired coupling of reference line signal transceiver 250 and a power supply. The power supply can charge an internal battery or other component of reference line signal transceiver 250. In specific embodiments, reference line signal transceiver 250 can include a solar panel or other means of supplementing power received and/or stored through conventional electrical connections.

Figure 3:
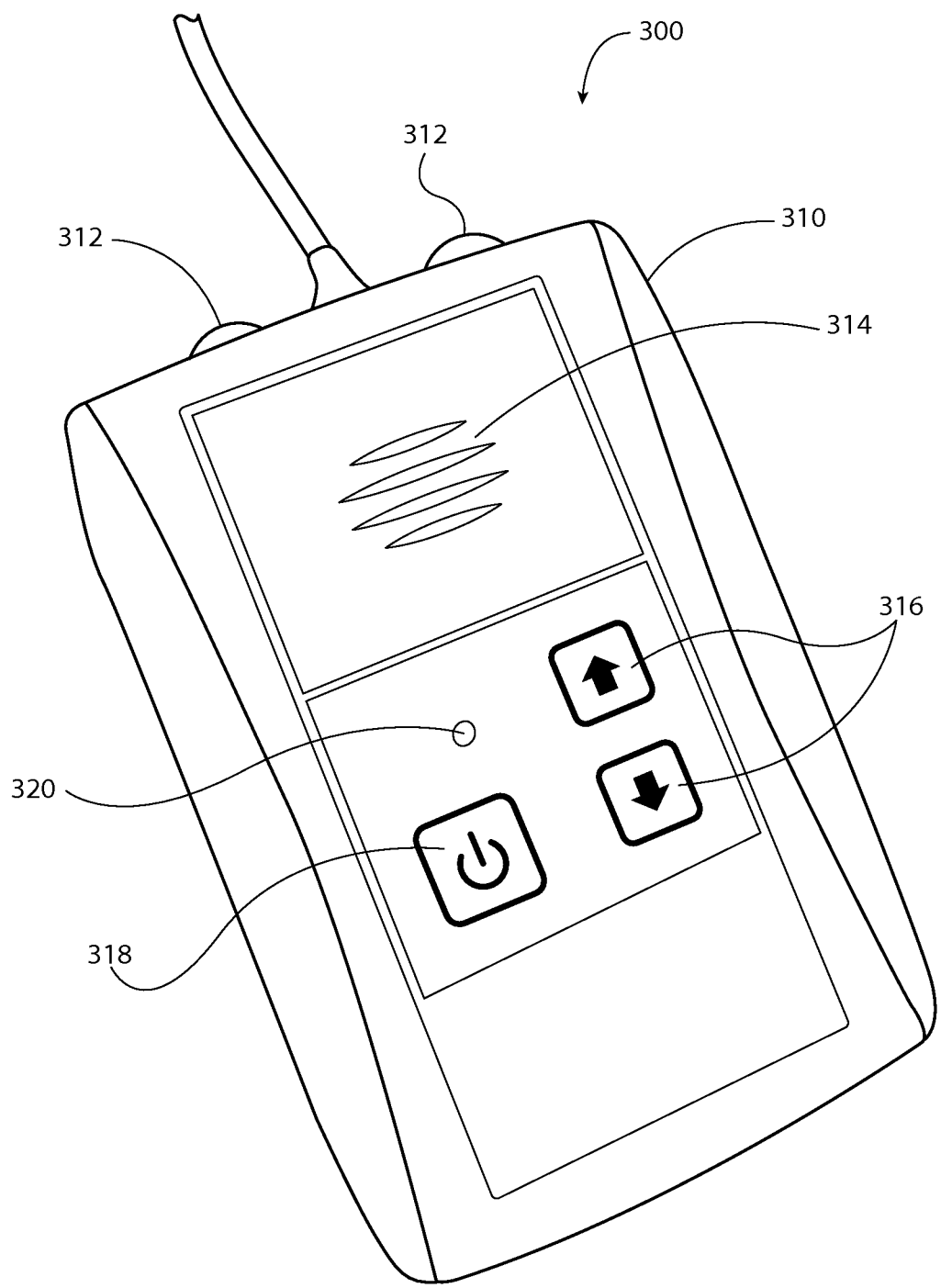
FIG. 3 illustrates an example operator unit for receiving signals related to a reference line.

FIG. 3 illustrates an example operator unit 300 for receiving signals related to a reference line. Operator unit 300 includes operator unit body 310. Operator unit body 310 indicator light sources 312, speaker 314, volume controls 316, power button 318, and power indicator 320, which function as described herein. Power button 318 operates to turn the operate unit 300 on and off. Power indicator light 320 displays a solid green light when the operate unit is powered on or a blinking green light when the battery of the operator unit is low. In response to interruption of the reference line, the indicator light sources 312 illuminate to provide a visual indication, and an audible indication is provided by speaker 314 based upon the volume settings established by the volume controls 316.

Various alternative or complementary operator units can include differing capabilities from those of illustrated operator unit 300. For example, a dedicated operator unit can have a screen (not pictured) and additional controls to provide two-way communication between the dedicated operator unit and other components of the system. Alternatively, an operator unit application can run on a mobile or onboard computer, such as a smart phone, tablet, vehicle interface, or others. In such embodiments, a rich graphical interface can be included to provided more detailed feedback or control.

Figure 4:
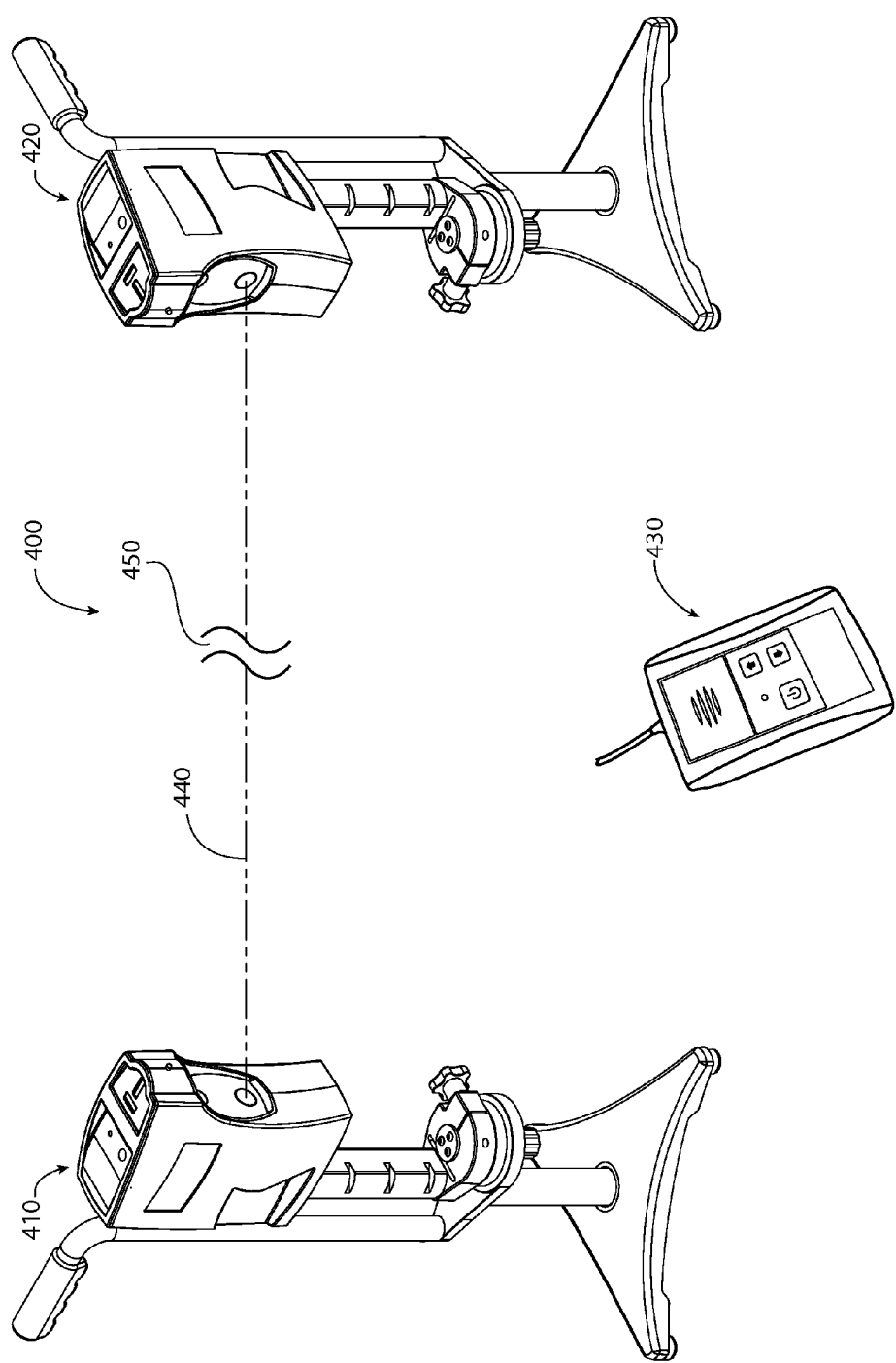
FIG. 4 illustrates an example system showing the reference line between reference line transmitter and reference line receiver.

FIG. 4 illustrates an example system 400 showing the reference line between reference line transmitter 410 and reference line receiver 420. Reference line transmitter 410 and reference line receiver 420 operate at a distance defining a segment of reference line 440 on which objects are to be aligned.

In practice, object 450 can be moved in one or more directions toward or away from reference line 440. So long as reference line 440 is uninterrupted, it is understood that object 450 has not intersected or crossed reference line 440, and is not yet aligned along reference line 440. In embodiments, during this time before interruption of reference line 440, no signal is sent to operator unit 430. In alternative embodiments, an uninterrupted signal is transmitted from at least reference line receiver 420 to operator unit 430 to indicate the reference line signal or energy is being received as expected and is accordingly uninterrupted.

As object 450 is moved in the direction of reference line 440, object 450 will eventually intersect reference line 440. When object 450 intersects with reference line 440, blocking or deflecting at least a portion of the energy associated with reference line 440, the signal or energy received by reference line receiver 420 will be modified, resulting in an inference that reference line 440 is interrupted. During this time, reference line receiver 420 can transmit a signal to operator unit 430 indicating reference line 440 is interrupted. In embodiments, reference line receiver 420 communicates in real-time with the operator unit 430 to provide a nearly instantaneous indication that the reference line has been interrupted, or conversely that the reference line has been reestablished. Such real-time communication enables an operator to position an object adjacent to the reference line responsive to the signal received by the operator unit 430.

When object 450 is withdrawn back behind reference line 440, or passes entirely through, reference line 440 will return to an uninterrupted state, as detected by reference line receiver 420 which will again receive the uninterrupted signal or energy from reference line transmitter 410. At this time, transmission of the reference line interruption signal is discontinued. In alternative or complementary embodiments, a reference line uninterrupted signal can be transmitted (or resume from a previously discontinued transmission) to indicate via the operator unit that the object is no longer in the path of the reference line. In this fashion, an object can be moved about reference line 440 to determine the precise position that best aligns it in regard to reference line 440.

Figure 5:
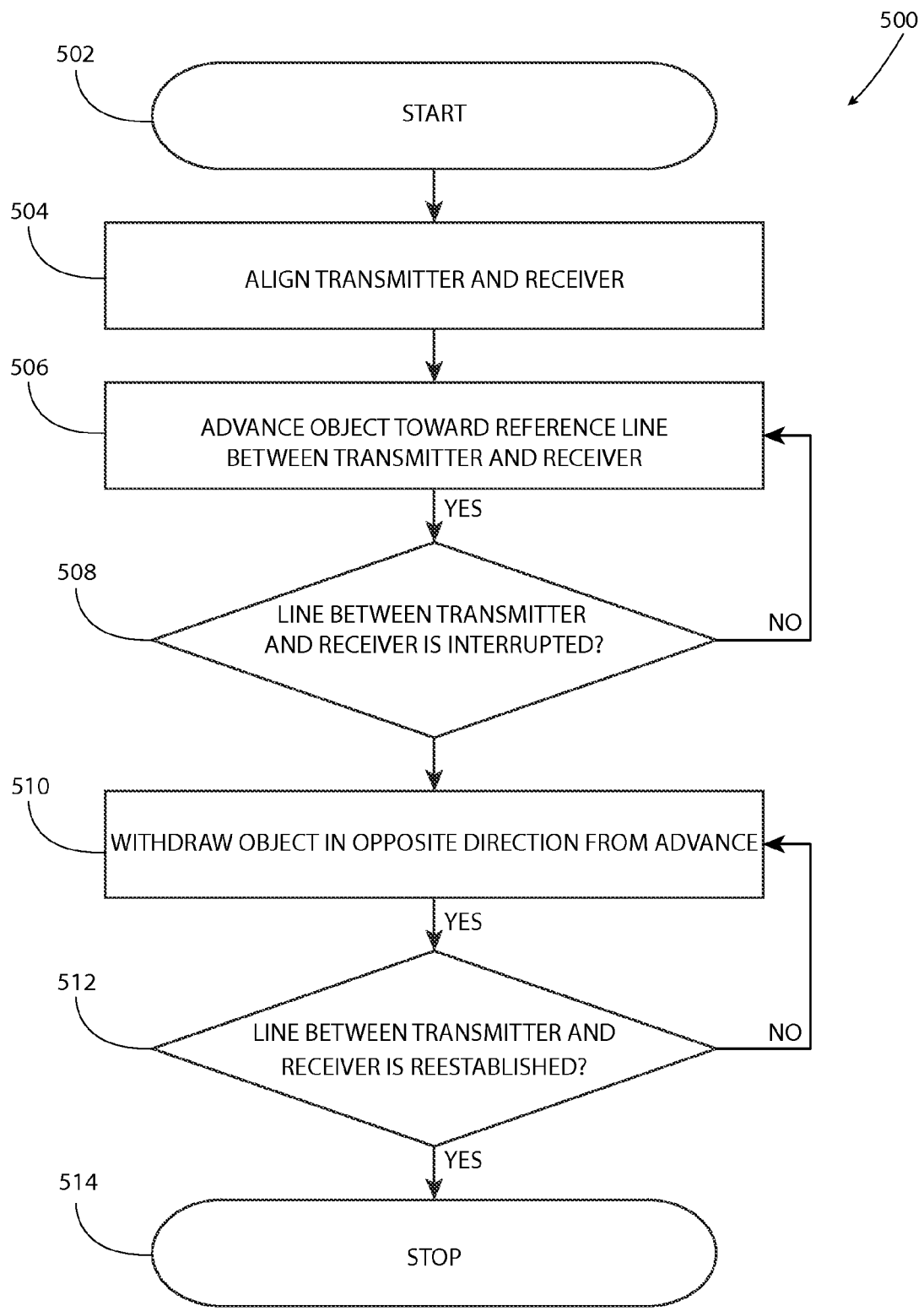
FIG. 5 illustrates an example methodology for moving an object into alignment based on interruption or reestablishment of a reference line.

FIG. 5 illustrates an example methodology 500 for moving an object into alignment based on interruption or reestablishment of a reference line. Methodology 500 begins at 502 and proceeds to 504 where a reference line transmitter and reference line receiver are aligned such that a signal exchanged between the two covers at least a segment of the reference line.

At 506, an object to be aligned is advanced toward the reference line between the reference line transmitter and reference line receiver. The object proceeds in a direction of advance. A determination is made at 508, which determines when the segment of the reference line between the reference line transmitter and reference line receiver is broken. So long as the determination at 508 returns negative, methodology 500 recycles to 506 where the object continues to move in the direction of advance. When this determination returns positive, the objects' advance in the direction of advance ceases and methodology 500 proceeds to 510.

At 510, the object is withdrawn opposite the direction of advance. A determination at 512 returns negative until the reference line between the reference line transmitter and reference line receiver is restored to an uninterrupted status, meaning the object has been withdrawn past the reference line. When the determination at 512 returns positive, methodology 500 proceeds to 514 where the methodology ends.

In specific embodiments, several iterations of methodology 500 (or subroutines thereof) can be performed to align a single object such that the advance and withdraw are repeatedly refined to specifically identify the exact point before the object interrupts the reference line. In alternative or complementary embodiments, multiple iterations are also performed to align more than one object. In this regard, various additional determinations or steps related to decisions regarding alignment precision and/or sets of objects can be added to methodologies disclosed herein (such as methodology 500) without departing from the scope or spirit of the innovation.

Figure 6:
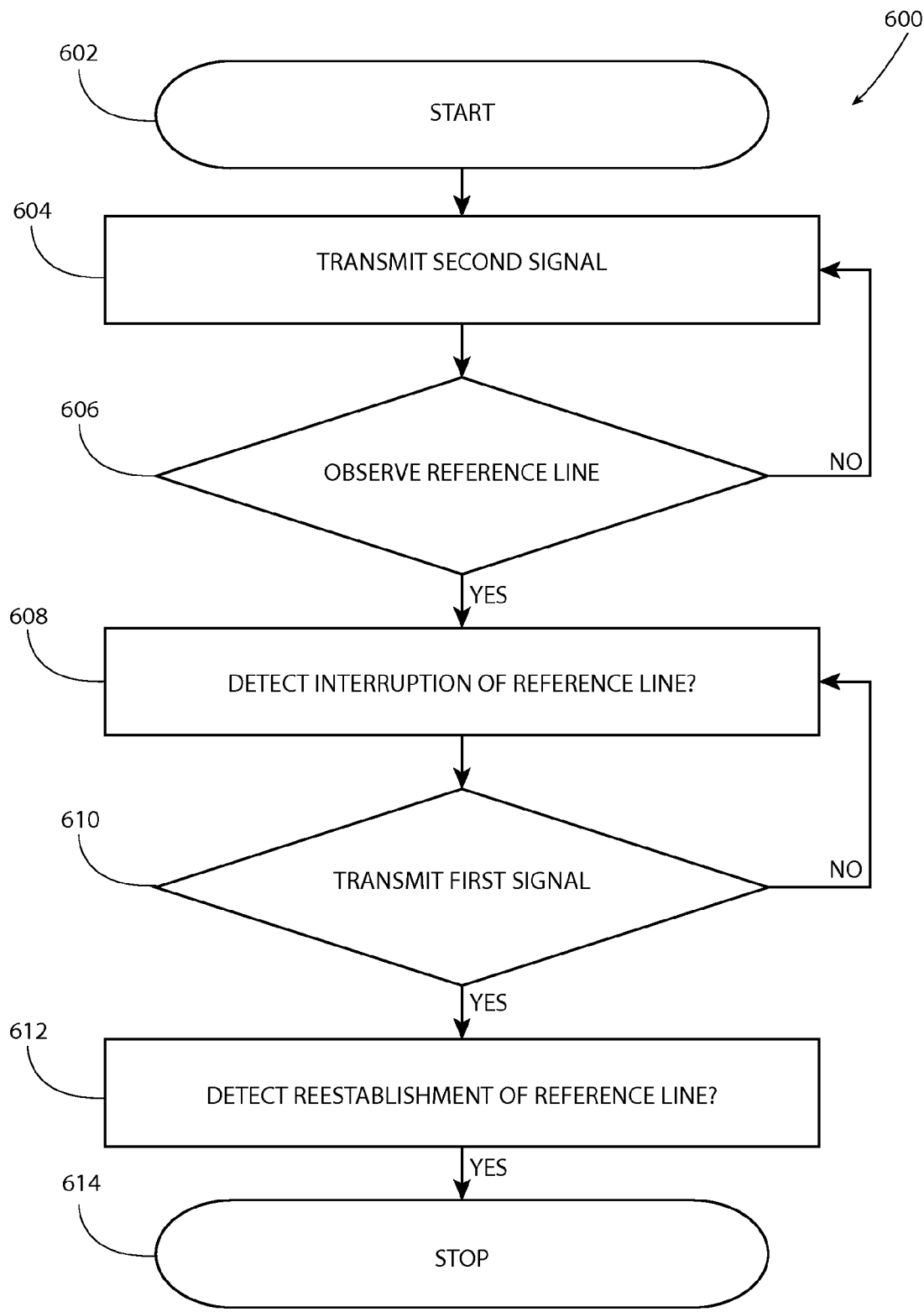
FIG. 6 illustrates an example methodology for transmitting signals in response to a reference line being interrupted or reestablished.

FIG. 6 illustrates an example methodology 600 for transmitting signals in response to a reference line being interrupted or reestablished. Methodology 600 begins at 602 and proceeds to 604 where a reference line is observed. Observation of a reference line can be accomplished using electronic means such as a reference line transmitter and a reference line receiver. Observation can include, but is not limited to, determining a status of the reference line, such as uninterrupted or interrupted.

At 606, a determination is made as to whether the reference line is interrupted. If the reference line is not interrupted, methodology 600 is referred to 604 where observation of the reference line is continued. However, when the determination at 606 returns positive, indicating the reference line is interrupted, methodology 600 proceeds to 608.

At 608, a first signal is transmitted indicating the reference line has been interrupted. The first signal can be a signal sent to an operator unit or other device indicating the reference line has been interrupted by one or more objects. In embodiments, the signal is sent to the operator unit in real-time.

At 610, methodology 600 determines whether the previously-interrupted reference line has been reestablished, indicating the object has been withdrawn to a position that does not disrupt the reference line. So long as the determination at 610 returns negative, methodology 600 returns to 608 and the first signal indicating interruption of the reference line can remain active.

When the determination at 610 returns positive, methodology 600 advances to 612 where the reference line has been reestablished and is in an uninterrupted state. At 612 a second signal associated with reestablishment of the reference line is transmitted to the operator unit or other device to indicate reestablishment of the line, which may also be in real-time. After the line is reestablished and the associated signal transmitted, methodology 600 can terminate at 614.

In specific embodiments, several iterations of methodology 600 (or subroutines thereof) can be performed to align a single object such that the reference line can be interrupted and reestablished multiple times to refine alignment or perform alignment of multiple objects. In this regard, various additional determinations or steps related to decisions regarding alignment precision and/or sets of objects can be added to methodologies disclosed herein (such as methodology 600) without departing from the scope or spirit of the innovation.

Figure 7:
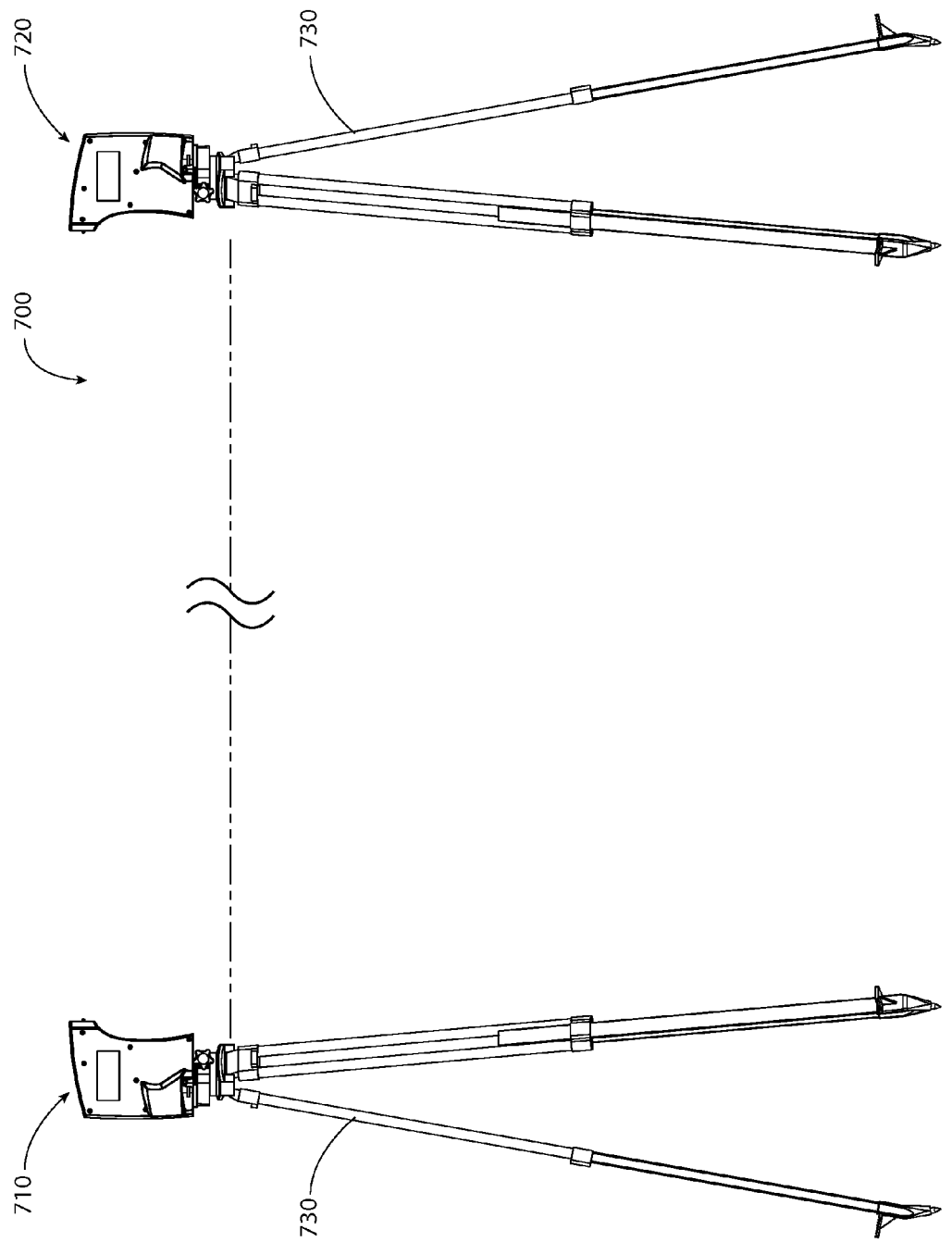
FIG. 7 illustrates another example system for establishing a reference line and receiving signals related to the reference line.

FIG. 7 illustrates another example system 700 showing the reference line between reference line transmitter 710 and reference line receiver 720. Reference line transmitter 710 and reference line receiver 720 are each mounted upon a tripod 730 facilitating use of the system on uneven surfaces. The system 700 including tripods 730 may be used for aligning fence posts, columns, light poles, crops or other objects as may be desired. As will be apparent, the system presently disclosed may be used in a wide range of applications where precise alignment over extended distances is desired.

Systems and methodologies described herein can be integrated with various other technologies to improve identification or placement of reference lines and associated components, identification of objects being aligned, particular arrangements of aligned objects, and alignment in multiple dimensions.

In an example, components such as a reference line transmitter or a reference line receiver utilize at least one geo-location technique (e.g., Global Positioning System coordinates, triangulated location) to precisely position components and facilitate more specific alignment of objects.

In another example, specific objects moved in relation to a reference line are identified and tracked. One embodiment can utilize code scanners or RFID tags to indicate a particular object. An alternative embodiment can include association of an operator unit or other device with a computer onboard a vehicle being moved (e.g., BlueTooth® integration of a signaling or control component).

As suggested above, an operator unit may include a rich graphic display in embodiments. In such embodiments, a visual display of alignment may be provided. Such visual displays may utilize information related to the size of objects being aligned to display scaled representations of the objects during or after alignment. In further embodiments, the locations of objects previously aligned can be stored to continue displaying the position of aligned objects while alignment of further objects is ongoing.

Further, while illustrated embodiments show a single reference line transmitter and single reference line receiver permitting alignment along one reference line there between, it is understood that two or more reference line transmitters and/or two or more reference line receivers can be employed to facilitate alignment along two or more lines.

Additionally, various computer systems and storage techniques can be employed to record and later-access alignment activity, system usage history, past item placement in various environments, and collateral information associated with systems and methods herein.

While principles and modes of operation have been explained and illustrated with regard to particular embodiments, it is understood that various aspects of the subject innovation(s) may be practiced otherwise than as specifically explained and illustrated without departing from the spirit or scope of the disclosure.

What is claimed is:

1. A method of aligning objects, comprising:
   aligning two reference lines, wherein the reference lines are aligned across a first unit and a second unit;
   advancing one or more objects in a direction of advance toward the reference lines;
   interrupting at least one of the reference lines with the one or more objects;
   transmitting a signal synchronously and contemporaneously with the interruption by one or more objects to an operator unit to create an indicator of a breach, and
   withdrawing the one or more objects opposite the direction of advance until the reference lines are not uninterrupted, wherein the signal continues and -discontinues synchronously and contemporaneously with the interruption of the reference lines.

2. The method of claim 1, wherein the reference lines are created using IR radiation.

3. The method of claim 1, where operator unit is wirelessly connected to the first unit or the second unit.

4. The method of claim 1, wherein the operator unit is in a vehicle.

5. The method of claim 1, wherein the transmission of the signal terminates with the reestablishment of the reference lines.

\* \* \* \* \*